(12) United States Patent
Ekstam

(10) Patent No.: US 11,846,260 B2
(45) Date of Patent: Dec. 19, 2023

(54) RETROFITTING AN OPERATING VEHICLE FUEL DELIVERY SYSTEM WITH A FUEL-AIR SEPARATOR

(71) Applicant: CD Patents, LLC, Ft. Myers, FL (US)

(72) Inventor: Charles L Ekstam, Ft. Myers, FL (US)

(73) Assignee: CD PATENTS, LLC, Jefferson City, MO (US)

( * ) Notice: Subject to any disclaimer, the term of this patent is extended or adjusted under 35 U.S.C. 154(b) by 0 days.

(21) Appl. No.: 16/991,837

(22) Filed: Aug. 12, 2020

(65) Prior Publication Data

US 2020/0370521 A1 Nov. 26, 2020

Related U.S. Application Data

(63) Continuation of application No. 15/041,896, filed on Feb. 11, 2016, now Pat. No. 10,774,799.

(Continued)

(51) Int. Cl.
*F02M 37/20* (2006.01)
*F02M 37/32* (2019.01)
(Continued)

(52) U.S. Cl.
CPC ............. *F02M 37/20* (2013.01); *B01D 19/00* (2013.01); *B01D 19/0031* (2013.01);
(Continued)

(58) Field of Classification Search
CPC .. F02M 37/22; F02M 37/32–36; F02M 37/54; B01D 35/00; B01D 35/005; B01D 35/026; B01D 36/001
(Continued)

(56) References Cited

U.S. PATENT DOCUMENTS 3,809,244 A * 5/1974 Jackson ................. F02M 37/32
210/136
4,437,986 A 3/1984 Hutchins et al.
(Continued)

FOREIGN PATENT DOCUMENTS

CA 1163156 3/1984
DE 102013204246 A1 9/2014
(Continued)

OTHER PUBLICATIONS

Extended European Search Report for corresponding European patent application No. 16769747.3 dated Jun. 26, 2018.
(Continued)

*Primary Examiner* — Phutthiwat Wongwian
*Assistant Examiner* — Arnold Castro
(74) *Attorney, Agent, or Firm* — Sandberg Phoenix & von Gontard P.C.

(57) ABSTRACT

A method for retrofitting an operating fuel delivery system of a vehicle. The method includes obtaining a vehicle having an operating fuel delivery system, which includes an interconnected fuel tank, a fuel pump and an engine. Obtaining an air separator configured to be attached to the fuel delivery system at a connection point wherein the fuel pump and the engine are in direct fluidic communication and also obtaining attachment means for connecting the air separator to the fuel delivery system by fluidically mounting the air separator at the connection point wherein the fuel pump and the engine are secured in direct fluidic communication.

14 Claims, 7 Drawing Sheets

Related U.S. Application Data

(60) Provisional application No. 62/174,920, filed on Jun. 12, 2015, provisional application No. 62/138,222, filed on Mar. 25, 2015.

(51) Int. Cl.
  *F02M 37/34* (2019.01)
  *F02M 37/54* (2019.01)
  *B01D 36/00* (2006.01)
  *B01D 19/00* (2006.01)
  *F02M 37/22* (2019.01)

(52) U.S. Cl.
  CPC ......... *B01D 36/001* (2013.01); *B01D 36/005* (2013.01); *F02M 37/22* (2013.01); *F02M 37/32* (2019.01); *F02M 37/34* (2019.01); *F02M 37/54* (2019.01)

(58) Field of Classification Search
  USPC ............... 123/434, 516; 137/351; 210/416.4
  See application file for complete search history.

(56) References Cited

U.S. PATENT DOCUMENTS

| | | | |
|---|---|---|---|
| 5,355,860 A | 10/1994 | Ekstam | |
| 5,529,314 A | 6/1996 | Ekstam | |
| 5,746,184 A | 5/1998 | Ekstam | |
| 6,729,310 B2* | 5/2004 | Ekstam | F02M 37/54 123/516 |
| 6,892,710 B2 | 5/2005 | Ekstam | |
| 7,025,048 B2 | 4/2006 | Ekstam | |
| 2001/0015135 A1 | 8/2001 | Chybin et al. | |
| 2002/0170545 A1* | 11/2002 | Ekstam | F02M 53/00 123/557 |
| 2006/0137663 A1 | 6/2006 | Vaught | |
| 2008/0035121 A1* | 2/2008 | Wieczorek | F02M 37/54 123/516 |
| 2011/0048548 A1* | 3/2011 | Rahm | F02M 37/42 137/351 |
| 2014/0208702 A1 | 7/2014 | Lundgren et al. | |
| 2015/0231538 A1* | 8/2015 | Ahmad | B01D 36/001 210/436 |
| 2016/0281662 A1* | 9/2016 | Ekstam | F02M 37/34 |

FOREIGN PATENT DOCUMENTS

| | | | |
|---|---|---|---|
| EP | 0819458 A1 * | 1/1998 | ........... B01D 35/147 |
| EP | 0819458 A1 | 1/1998 | |
| WO | 2014139813 A1 | 9/2014 | |

OTHER PUBLICATIONS

International Search Report for Corresponding PCT application No. PCT/US2016/024151 dated Jun. 20, 2016.
Written Opinion for Corresponding PCT application No. PCT/US2016/024151 dated Jun. 20, 2016.

* cited by examiner

RETROFITTING AN OPERATING VEHICLE FUEL DELIVERY SYSTEM WITH A FUEL-AIR SEPARATOR

CROSS-REFERENCE TO RELATED APPLICATIONS

This Continuation application claims the benefit of U.S. Provisional Patent Application Ser. No. 62/138,222, filed Mar. 25, 2015, and U.S. Provisional Patent Application Ser. No. 62/174,920, filed Jun. 12, 2015, and U.S. Non-Provisional application Ser. No. 15/041,896, filed Feb. 11, 2016, all of which are hereby incorporated herein by reference.

STATEMENT REGARDING FEDERALLY SPONSORED RESEARCH OR DEVELOPMENT

Not applicable.

BACKGROUND OF THE INVENTION

The subject matter described herein relates generally to an improved air separation system for combustible liquids, petroleum-based and renewable and alternative fuels, especially fuel for diesel and other internal combustion engines.

Combustible fuel and especially diesel, engines typically utilize a fuel injection system to timely inject fuel directly into the cylinder. The injection timing is predetermined by the engine designer, and is based on known facts. Any uncontrolled or outside event or condition that affects the injection timing that is not predetermined or that affects the spray pattern, will cause the engine's efficiency to degrade.

A persistent concern for such engines is the presence of air and vapor within the fuel. Entrained air and vapor in combustible fuel and combustible fuel systems, varies with fuel temperature, barometric pressure and altitude of engine operation, filter plugging, and at the different operating RPM's of the engine. Air and vapor present in combustible, especially diesel, fuel, and especially in varying amounts, are not found to be among the predetermined conditions factored into the injection timing parameters. Among the problems presented by their presence is the degradation of engine efficiency due to the compressibility of air/vapor. In unit injectors, this leads to retarded injection timing, spray pattern disruption and a poor burn, in turn, resulting in reduced power output of the engine, increased fuel consumption and increased exhaust emissions. In "Common Rail" systems, the air/vapor displaces the fuel in the "High Pressure Pump" barrel. This prevents the "High Pressure Pump" from reaching its designed output volume. This in turn prevents the system from maintaining the correct pressure for proper spray patterns and injection rates, degrading engine efficiency.

Air also causes permanent damage to the components of the fuel injection system. Air can displace the fuel or lubricant between the barrel and plunger. This allows metal on metal contact and galling of the components, leading to injector failure. Also, as the plunger begins its injection stroke, the sudden compression causes the air bubble to implode. When the collapsing bubble is adjacent to the barrel wall, the outer wall of fuel of the collapsing bubble impacts the barrel surface with sufficient destructive force to dislodge microscopic particles of metal. This is commonly referred to as "pitting of the barrel", and in time can render the injector useless. "Tip erosion" occurs as the air bubble exits the injector tip. Air, being less viscous than diesel fuel passes through the injector tip more quickly than the fuel. The fuel behind the air bubble suddenly impacts the tip with a force that dislodges microscopic particles of metal. As tip erosion increases the bore size of the ports of the injector tip, a poor spray pattern increasingly results. A decrease of the metal between the ports leads to degradation of the structural integrity of the injector tip, which can eventually lead to the loss of the injector tip and catastrophic engine failure.

The operational deficiencies and inefficiencies of the diesel engine are well known, but commercial implementations of such engines have failed to address this problem.

Applicant has previously provided unique systems and apparatus for removing entrained air from the fuel prior to the fuel's entering into the engine's fuel pump while additionally maintaining a net positive pressure head to the pump inlet, thus reducing pump cavitation and the formation of vapor.

Applicant's U.S. Pat. No. 5,355,860 discloses a three filter system for removing entrained air from diesel fuel. The device, which feeds fuel to the engine's transfer or fuel pump, was an early pioneer approach for removing entrained air from the fuel.

Applicant's U.S. Pat. No. 5,746,184 (the "'184 Patent"), a continuation in part of U.S. Pat. No. 5,355,860, discloses a commercial model of the system that efficiently removes the entrained air and addresses pump cavitation. A product incorporating the principals of the '184 Patent has been successfully sold under the trademark, Fuel Preporator®, model numbers FPI and FP1200 by PureFlow Technologies, Inc. This device utilizes a filter to separate entrained air and vapors from the fuel (Ref. Cummins Service Topic 5-135, 1965) and a "Primary" air/vapor discharge port located on the dirty side of the filter to facilitate the removal of the separated air/vapors. Additionally, a second air/vapor discharge port located on the clean side of the filter is used to discharge air/vapors that have been pressure flashed through the filter. The method of air/vapor separation utilized within or on the clean side of the filter media is passive and depends upon flotation of the bubbles to rise to the discharge port.

Applicant's U.S. Pat. No. 6,729,310 (the "'310 Patent"), brought about a more advanced air/vapor separation system that allowed the device to be substantially reduced in size and to separate air/vapor at much higher fuel flows than earlier models. The first systems, applying the principles of the '310 Patent, were commercially sold as model numbers FP135, FP135A. Much smaller models came about later and were sold under the trademarks AirDog® 80, 100, 150 and AirDog®II 125, 150, 165, and 200 by PureFlow Technologies, Inc.

U.S. Pat. Nos. 6,892,710 and 7,025,048 are patents pertaining to the FASS fuel air separation system manufactured by DPPI, INC. This system utilizes only the secondary or passive air separation method and discharge port 428 as shown in U.S. Pat. No. 5,746,184 prior art patent. And as the U.S. Pat. No. 5,746,184 prior art patent Abstract explains, "As the bubbles are trapped on the (filter) element, they float upwardly for discharge through discharge port (294) (FIG. 8). Bubbles passing through element 94 are swept upwardly for discharge through the outlet side discharge port (428)".

Although the previous devices provided by Applicant have successfully addressed the issue of removing entrained air from fuel and substantially reduced vapors formed through pump cavitation, additional vapors can form after the transfer pump. These vapors may form within the high pressure bypass valve (pressure relief valve) and fuel lines due to pressure drops and high fuel temperatures.

The Clausius-Clapeyron Equation (see FIG. 1) explains the relationship between pressures and temperatures within a closed loop system and the enthalpy of vaporization of a liquid from plots of the natural log of its vapor pressure versus temperature. This allows one to understand that vapors will form within the fuel system itself. While such vapor formation cannot be prevented, the vapors may be substantially removed before they enter the fuel injection system of the engine.

Applicant herein provides an improved, highly efficient and more cost effective device for separating and virtually eliminating such air and vapor from combustible, especially petroleum-based liquids, configured for high pressure and other fuel systems. The device has improved air discharge means that enhances the collection and removal of unwanted entrained air and vapors without a significant loss of pressure or flow to the engine. Additionally, in preferred embodiments, the device is to be mounted, e.g., fluidically, after the engine's fuel, e.g., fuel transfer pump, thus eliminating the requirement of an additional pump on the device, and before the fuel enters the fuel injection system of the engine, which would remove any additional vapors formed within or after the engine fuel pump.

BRIEF SUMMARY OF THE INVENTION

Accordingly, an improved air separator, fuel delivery system and installation set are provided which address the needs and provide the advantages outlined herein. The invention includes an air separator having a vessel defining a hollow interior chamber. The chamber has an inlet configured for receiving fuel from a fuel source and an outlet configured for fluidic communication with an engine. The chamber also has an air-bleed configured for fluidic communication to a port through which unwanted gas is discharged, e.g., by communication with a return line in fluidic communication with a fuel tank so that undesired gas can be returned thereto. A filter media is positioned within the chamber for contact with fuel received in the chamber and a conduit is located within the filter media for delivering fuel passing through the filter media to the outlet. The air separator is configured to remove a quantity of undesired gas from the fuel prior to passage of the fuel through the outlet from the vessel to the engine, with such undesired gas passing through the air-bleed. The air-bleed optionally has a gas collection area, which may be, e.g., somewhat in the shape of a depression from the surrounding surface of the air bleed, where gas bubbles congregate before exiting. The air bleed further includes a fluidic mixing alcove specially configured to entrap a larger concentration of large and small gas bubbles upon entrance and retention within the alcove so that they exit the air-bleed into the discharge port while reducing resistance to fuel flow and pressure loss through the discharge port.

In an aspect of the invention, an active secondary air-bleed is located between the fuel filter element and the outlet on the clean side.

In another aspect, a wiper blade configured flow divider is installed together with a filter nipple beneath the filter head.

In a further embodiment, a fuel delivery system is provided including a fuel tank, a fuel, e.g., transfer pump, an air separator and an engine, wherein the air separator is fluidically mounted directly between the fuel pump and the engine. The air separator may include a vessel defining a hollow interior chamber. The chamber has an inlet configured for receiving fuel from a fuel source, an outlet configured for fluidic communication with an engine, an air-bleed configured for fluidic communication to a port through which unwanted gas is discharged, a filter media positioned within the chamber for contact with fuel received in the chamber and a conduit located within the filter media for delivering fuel passing through the filter media to the outlet. In preferred embodiments, the fuel delivery system includes the features of the air separator described above, and the air separator readily attaches to a base of a secondary filter, or may be conveniently accessed from a raised position via a lid.

In a further embodiment, a streamlined air separator consisting essentially of the vessel, filter media and conduit, and optionally a check valve, without significant additional features is provided, thereby allowing for a smaller, compact, and cost-efficient air separator apparatus which can be mounted fluidically directly between an engine's transfer pump and the engine. In a further embodiment, an air separator as described above is provided which excludes any additional air-bleeds.

Also provided is an air separator installation set which provides for incorporation of an air separator directly onto a fuel delivery system. It includes the air separator generally as described above and attachment means for mounting the separator fluidically between the fuel pump and the engine. In particular embodiments, the installation set specifically excludes any electrical components, a separate fuel pump for the air separator, or the combination thereof.

In yet another embodiment, an installation set as generally described above is provided wherein the installation set further specifically excludes a separate water filter component.

BRIEF DESCRIPTION OF THE DRAWINGS

The presently disclosed subject matter will be better understood from reading the following description of non-limiting embodiments, with reference to the attached drawings, wherein below.

DETAILED DESCRIPTION OF THE INVENTION

Figure 1:
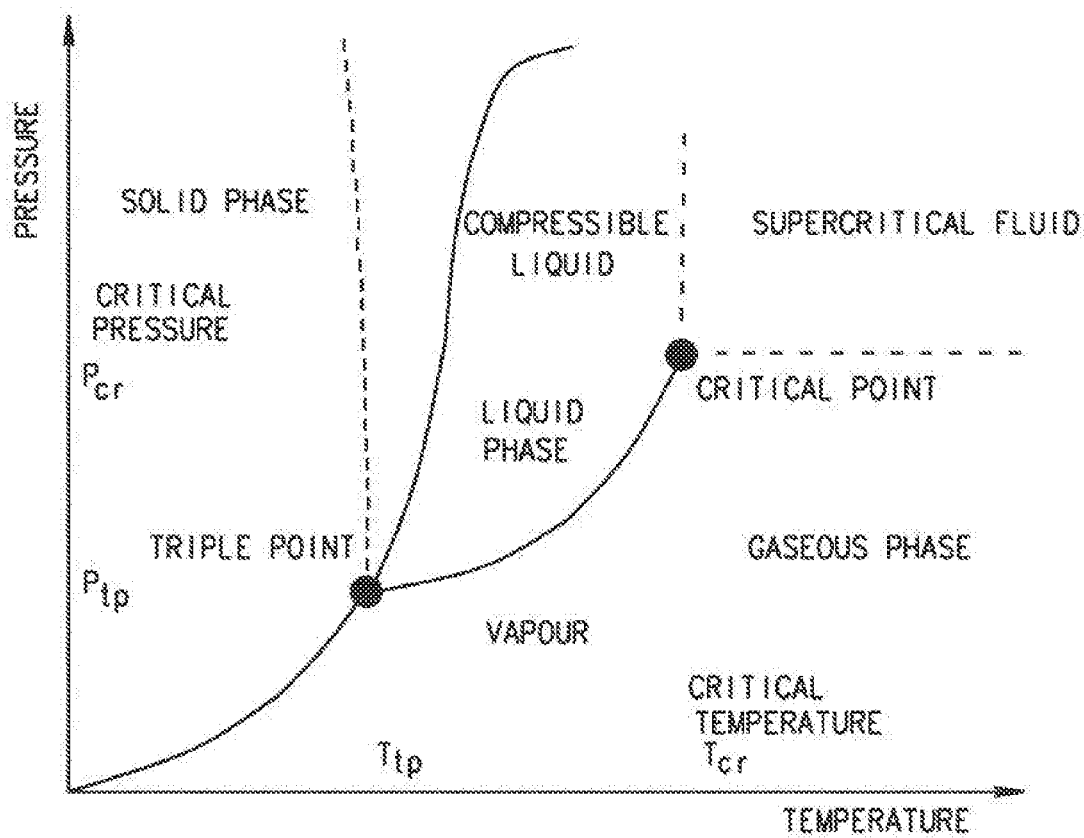
FIG. 1 is a graphic depiction provided by Matthieumarechal of the Clausius-Clapeyron Equation, showing the relationship between pressures and temperatures and the vaporization of a liquid.

The foregoing summary, as well as the following detailed description of certain embodiments will be better understood when read in conjunction with the appended drawings. As used herein, an element or step recited in the singular and proceeded with the word "a" or "an" should be understood as not excluding the plural of said elements or steps, unless such exclusion is explicitly stated. Furthermore, references to "one embodiment" or "an embodiment" are not intended to be interpreted as excluding the existence of additional embodiments that also incorporate the recited features. Moreover, unless explicitly stated to the contrary, embodiments "comprising", "having" or "including" an element or a plurality of elements having a particular property may include additional such elements not having that property.

Applicant has developed a series of innovations providing improvements in engine performance based on apparatus and systems designed to separate and remove performance debilitating air and vapor from fuel prior to its injection into an engine. Various of these innovations are the subject of prior patents, including U.S. Pat. Nos. 5,355,860; 5,529,314; 5,746,184; and 6,729,310, each of which is incorporated herein by reference as though fully set forth herein.

Various embodiments as described and shown herein provide for yet a more efficient air separator with fewer components, subject to less possibility of malfunction and long-term wear, and a more streamlined, more readily installed, and less costly overall fuel delivery system, while maintaining the important advantages of effective air removal which is the hallmark of applicant's earlier inventions in the field of air-fuel separation. Moreover, these air separators feature a distinctively enhanced air-bleed component which dramatically improves the ability of the separator to entrap and remove entrained gases from the combustible, diesel, e.g., fuel while at the same time reducing bubble "bounce off", and minimizing fuel pressure reduction.

Moreover, the air separators, diesel and other fuel delivery systems and installation sets of the present invention offer a single-unit air filter system which may be mounted directly between the engine's transfer pump and engine and provide for easy installation and operation. Remarkably, they eliminate the need for, and hence may be installed without, an additional air separator fuel pump and similarly, do away with the need for, and hence may be installed without, any electrical components. Further, they may be installed and used as a stand-alone air separator fuel system component without the need for an integral water filter component. By improving the removal of fuel line gases and streamlining and reducing the "working parts" of the fuel-air separator, a sturdy, long-lasting separator is provided which can be included at the outset in a combustible, diesel, or other petroleum-based or non-petroleum-based liquid fuel delivery system, or as part of an installation set for incorporation of such a separator, which is inexpensive, readily installed, and may be operated simply and durably for many years.

Referring to the various drawings, wherein identical reference numbers represent comparable components, a fuel-air separator (air separator) 100 is shown. In an embodiment (see, e.g., FIG. 2), the air separator 100 includes a vessel 12 defining an interior chamber 13, an inlet 14 which is configured for receiving fuel from a fuel source (not shown), and is in fluidic communication thereto, e.g., via a fuel line 18, an outlet 20 configured for fluidic communication directly or indirectly with an engine 200. The air separator 100 further comprises an air-bleed 22 configured for fluidic communication with a discharge port 24, e.g., a return line, in fluidic communication with, e.g. the fuel source 300 so that undesired gas may be returnable thereto, or may be otherwise discharged. Additionally, a filter media 26 is positioned within the vessel 12 for contact with combustible fuel received therein (and therefore dividing the air separator into a pre-filter dirty side and post-filter clean side) and a conduit 32 which is located within the filter media 26 for delivering fuel passing through the filter media 26 to the outlet 20. The air separator 100 is configured to remove a quantity of the undesired gas from the fuel prior to passage of the fuel through the outlet 20 from the vessel 12 to the engine 200, the undesired gas passing through the air-bleed 22. The air-bleed 22 optionally includes a gas collection area 28 where, e.g., a depression from the surrounding surface of the air-bleed 22 may be seen. With or without such a defined gas collection area 28, the air-bleed 22 includes a fluidic mixing alcove 30, which is specially configured to entrap and enhance the selective passage of the gas by inducing increased entry of both large and small gas bubbles into the discharge port 24, reducing bubble "bounce off", and reducing resistance to fuel flow and pressure loss through the discharge port 24, e.g. via a return line. Optionally, the air separator 100 may also include a check valve (not shown) which functions to prevent fuel drainage during filter change.

In preferred embodiments, the enhanced efficiency provided by the fluidic mixing alcove 30 and other features permit a highly streamlined air separator construction, consisting essentially of just the vessel (and its constituent parts), filter media and conduit components. The second or additional air-bleed holes of previously designed air separators may simply be dispensed with and excluded, thereby increasing cost-efficiency, performance and product durability.

Figure 3:
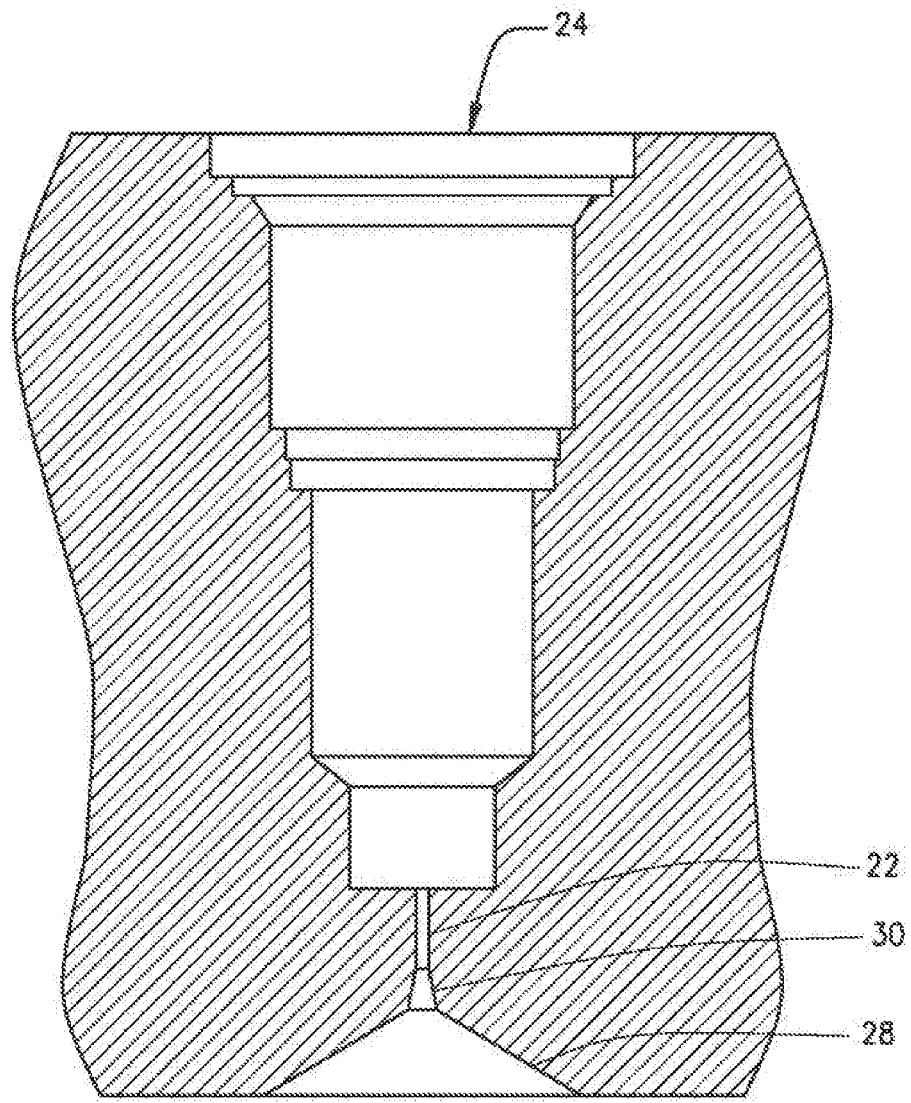
FIG. 3 is an enlarged front view of an embodiment of the air separator's air-bleed shown in FIG. 2.

The enhanced configuration provided by an embodiment exemplifying the air-bleed 22 of the invention with its specially configured fluidic mixing alcove 30 is depicted in greater detail in FIG. 3.

While the fluidic mixing alcove 30 of preferred embodiments of the air-bleed 22 may be constructed in a variety of shapes without departing from the lessons provided by Applicant, the core principles regarding its enhanced performance relate to the discovery that its shape, so configured, serves to entrap gas bubbles of varying sizes, large and small, and avoids bubble bounce off while reducing resistance to fuel flow and pressure loss through the discharge port.

By way of illustration, one may think of this phenomenon as analogous to that of a crowded school hallway. In a normal hallway, when a large number of kids attempt to enter, e.g., from a large gymnasium into a comparatively small, narrow hallway, even a very few large kids (analogous to the engine fuel) effectively block the smaller kids (gas bubbles) from gaining entry to the hallway (fuel surface tension helps create the "bounce off" phenomenon). But if configured as per applicant's teachings, the hallway is constructed to allow comfortable entry (an alcove) for both the big kids (fuel) and small kids (bubbles) to enter and leads them to move as a group to the more restrictive exit (discharge port) at the other end of the hallway without being blocked by the "bounce off" phenomenon described above.

Thus, as a general rule, the fluidic mixing alcove 30 of the air-bleed 22 will have sufficient initial dimension for efficient gas inlet (and entrapment) of both large and small bubbles regardless of the operating pressures and taper from such larger dimension of bubble entrance to a smaller dimension of bubble exit to achieve this result without substantial loss of pressure and flow. As would be apparent to one skilled in the art, the precise dimensions of prior art are tightly constricted, depending on, e.g., the relative PSI under which the system operates. Thus, in embodiments of the current invention, the dimensions of the mixing alcove may employ a greater degree of flexibility regardless of operating PSI, given the lessons provided herein.

Thus, as mentioned above, precise dimensions for optimum alcove configuration will vary, e.g., with the typical pressure under which the system operates, but are significantly more flexible due to the use of the port alcove configuration. In particular, diesel operating systems may vary, e.g., between 3 PSI and 400 PSI, just to feed the injection system. Accordingly, appropriate fluidic mixing alcove dimensions from input opening area to exit opening area, may respectively be between $35/1000$ths and $45/1000$ths, preferably between 37.5/1000ths and 42.5/1000ths, more preferably between $39/1000$ths and $41/1000$ths, and most preferably $40/1000$ths for the input opening area, to between $15/1000$ths and $25/1000$ths, preferably between 17.5/1000ths and 22.5/1000ths, more preferably between $19/1000$ths and $21/1000$ths, and most preferably $20/1000$ths, for the exit opening area. An approximately continuous tapering angle of between 20 degrees and 40 degrees, preferably between 25 degrees and 35 degrees, more preferably between 27.5 degrees and 32.5 degrees, still more preferably between 29 and 31 degrees, and most preferably, under typical operating conditions, an angle of 30 degrees is also suggested. The tapering distance will accordingly be determined by the selected tapering angle, which in turn will be a factor of the above-described variations in, e.g., operating pressure and other conditions.

In one embodiment, the air-bleed 22 optionally contains a gas collection area 28 where bubbles may pool before entering the alcove. One configuration which may preferably be used in such an area provides for a gently sloping indentation, or depression area, within a portion of the air-bleed surface moving toward the fluidic mixing alcove 30 and away from the surrounding surface area of the air-bleed 26. See, e.g., FIG. 3.

Figure 4:
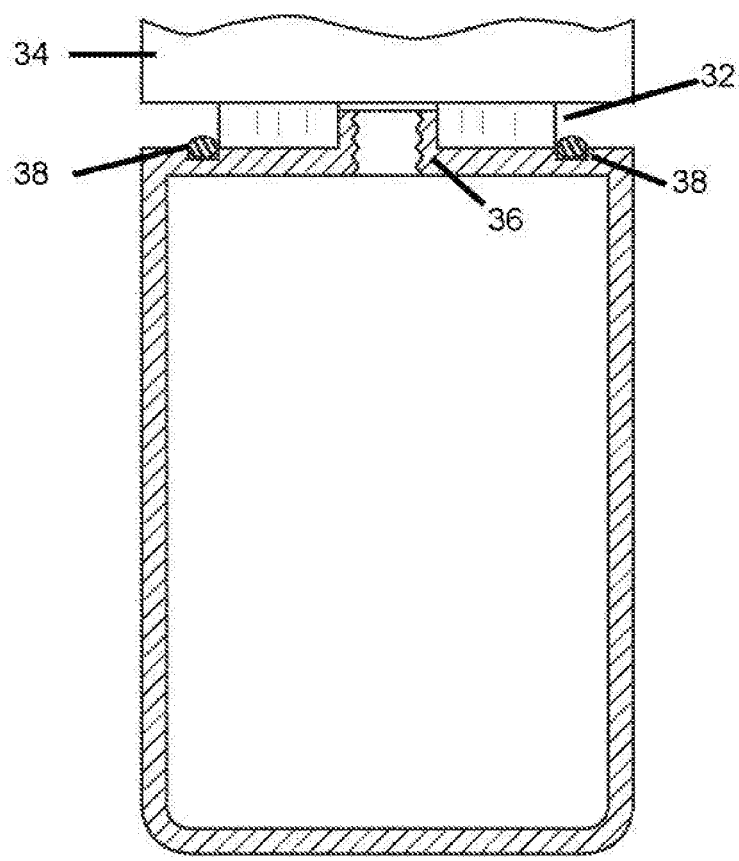
FIG. 4 is a front cross-sectional view of the air separator in which the wiper blade flow divider and filter nipple are depicted under the filter head.
Figure 5:
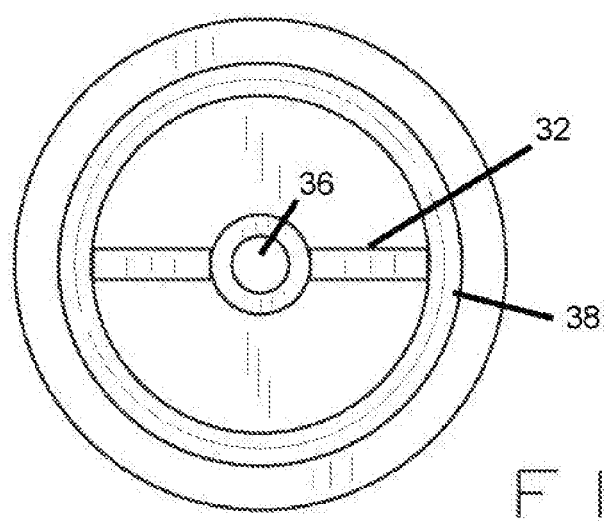
FIG. 5 is a top view of the air separator of FIG. 4.

In a preferred embodiment of the air separator, a flow divider 32 configured as a flexible "wiper blade" is positioned below the filter head 34, and thereby provides for directional flow of fuel between a dirty side 12*a* inlet and a dirty side exit of the air separator. Referring to FIG. 4, the air separator is shown in which the wiper blade flow divider 32 and a filter nipple 36 are depicted under the filter head 34. In this embodiment, see FIG. 4, a filter nipple 36 extends downward from the filter head between the head and the body of the filter. A gasket 38, as shown in FIG. 5, seals off the surrounding space.

Figure 6:
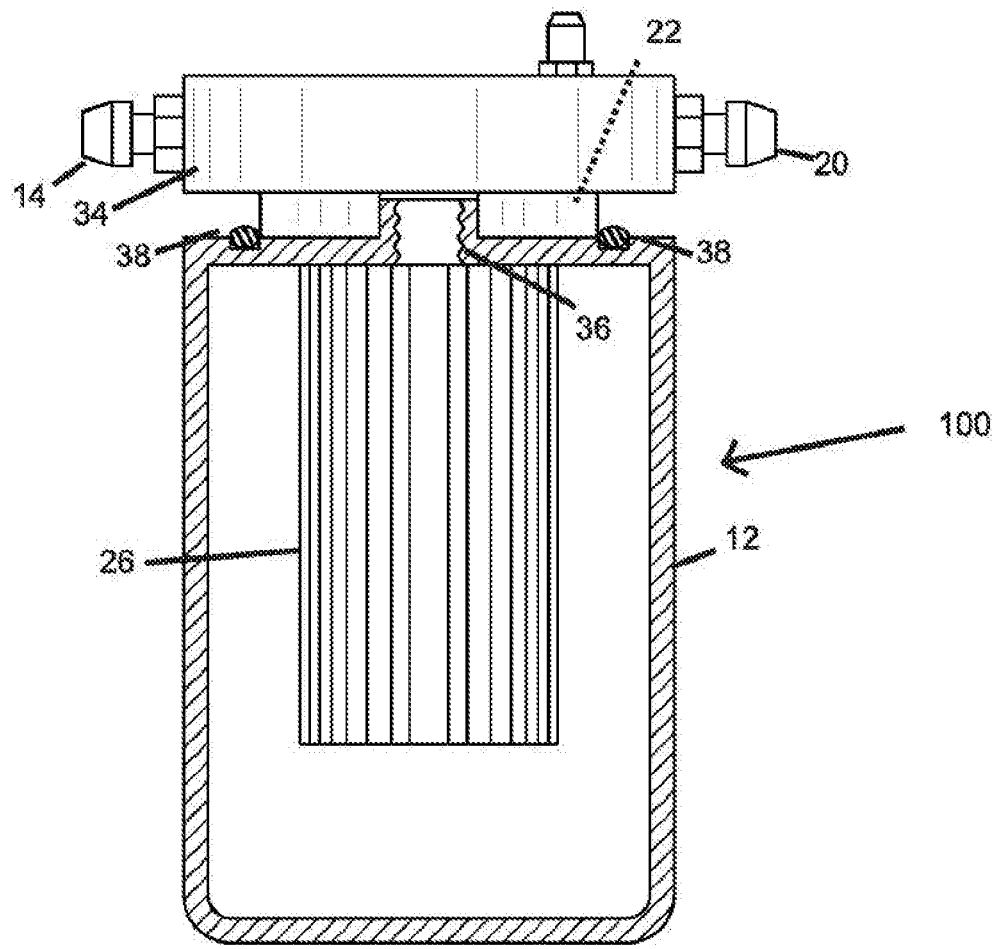
FIG. 6 is a front cross-sectional view of an embodiment of the air separator in which a secondary or alternative air bleed is shown located on the clean side of the air separator.

Referring to FIG. 6, a secondary or alternative air bleed 22 on the "clean" side 12*b* between the fuel filter and the outlet is shown which enhances the removal of additional vapors formed after the transfer pump, e.g., those formed within the high pressure bypass valve (pressure relief valve) and fuel lines due to pressure drops and high fuel temperatures.

Figure 2:
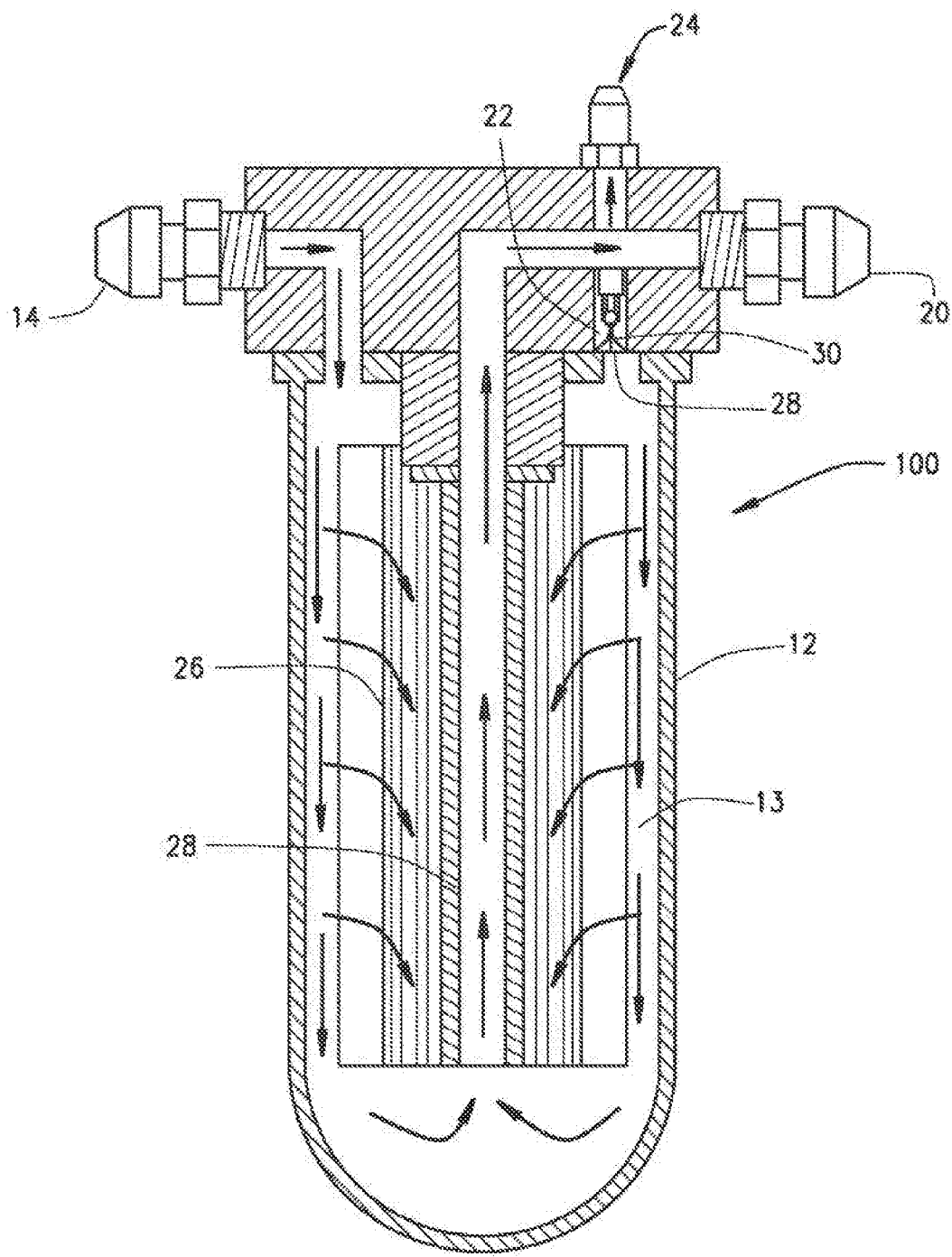
FIG. 2 is an enlarged, vertical cross-sectional view of the air separator in accordance with an exemplary embodiment of the present invention.
Figure 7:
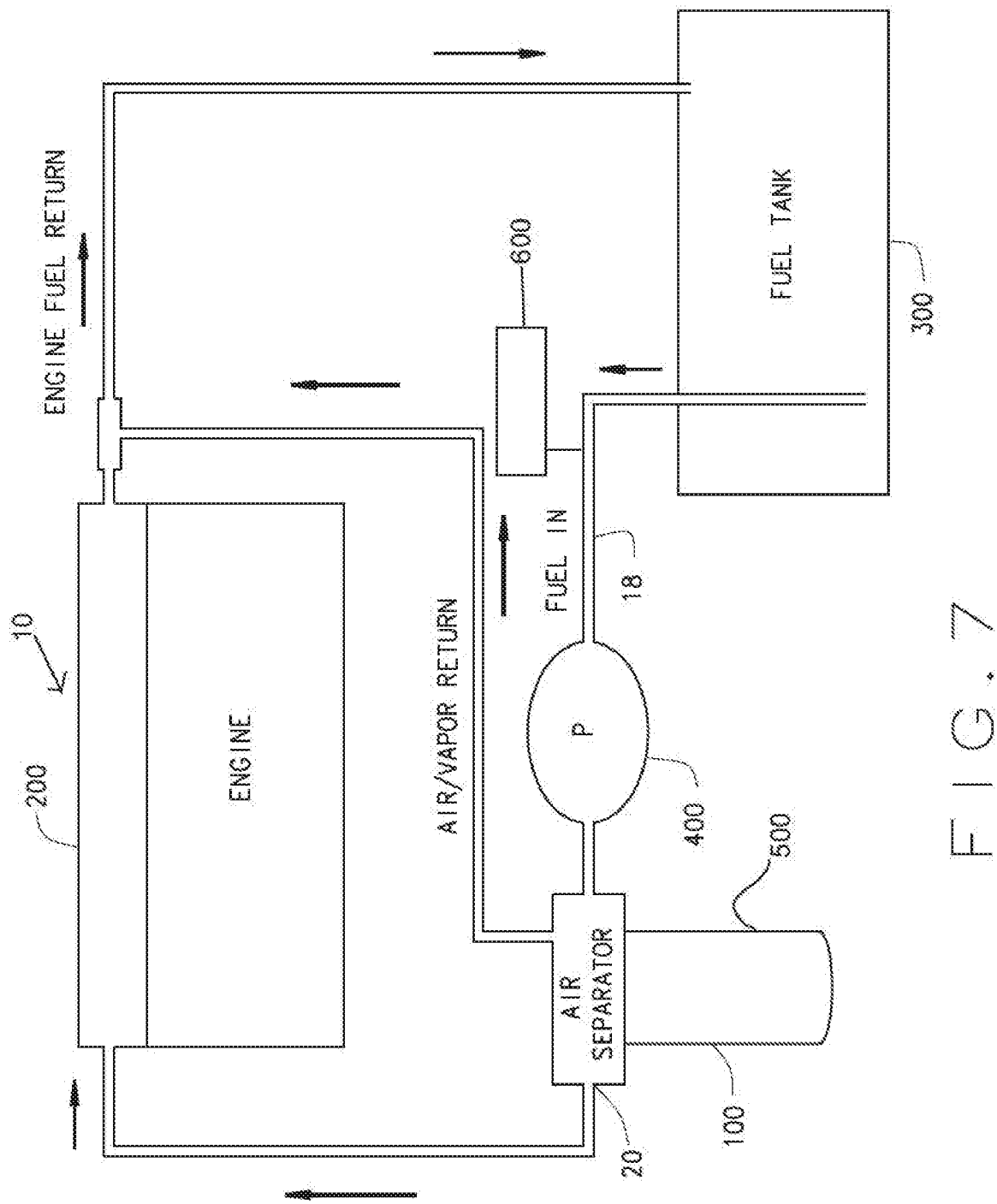
FIG. 7 is a schematic depiction of an exemplary embodiment of the fuel delivery system of the invention wherein the air separator is fluidically mounted directly between the fuel pump and the engine.

Referring to FIG. 7, an exemplary fuel delivery system 10 in accordance with the invention is depicted. As shown, the air separator 100 depicted in FIG. 2 is included as part of a fuel delivery system 10 which also includes a fuel tank 300, a fuel pump, e.g., fuel transfer pump 400, and an engine 200. The air separator 100 is fluidically mounted between the fuel transfer pump 400 and the engine 200. The fuel delivery system 10 may be used for any combustible, e.g., petroleum-based, alternative or renewable, liquid fuels, e.g., such as diesel, gasoline or mineral oil. Alternative or renewable fuels may include biodiesel or ethanol fuels.

In a preferred embodiment, the air separator 100 of the fuel delivery system includes the features described hereinabove. Moreover, the fuel delivery system may include a primary filter 600 located between the fuel tank and the fuel pump. As an additional feature, where the fuel delivery system includes a secondary filter (see FIG. 8) located between the fuel pump 400 and the engine 200, the air separator 100 may be designed so that it readily attaches to a base 52 of the secondary filter. In this embodiment, the secondary filter 500 comprises, in addition to the standard features of a filter, a base 52 from which the body of the filter may be removed. The air separator 100 is configured for ready attachment to the secondary filter 500, thereby replacing the secondary filter's body by one of various means of connection. These may be any means known to those skilled in the art, including matching threaded connections 36, e.g., at the center portion of the secondary filter's base 52 and the upper portion 40 of the air separator 100 (see FIG. 8). Alternatively, the filter base 52 and air separator 100 may be attached, e.g., by use of various latching mechanisms and high pressure interlocking press or screw-down fits (not shown).

In a preferred embodiment, to facilitate ready access, the fuel delivery system includes an air separator having a vessel defining a raised hollow interior chamber, a lid for access to said chamber, and otherwise is configured generally as described above for air separators. In this embodiment, the air bleed is preferably located within the lid, and also preferably, the air bleed has a fluidic mixing alcove configured to enhance selective passage of the gas through the discharge port as otherwise described herein.

Additionally, an installation set is provided for mounting the air separator onto, and incorporating it as a part of, the fuel delivery system. The set comprises the air separator 100 and attachment means for adapting the separator in the vicinity of the fuel delivery system's fuel pump 400. The air separator 100 may be attached, e.g., directly to the fuel delivery system such as by fluidically mounting it between the fuel pump 400 and the engine 200, such as by attaching it to the secondary filter as described above. Typical components for such means of attaching the air separator are well known to those skilled in the art, including such items as mounting brackets, bolts, nuts, washings, screws and unit connection fittings (not shown). As described above, where the secondary filter having a threaded base 52 constitutes the point of attachment, the means of attachment (e.g., matching threads at the top end 36 of the air separator 100), may be integral to the air separator 100 and the filter. Fuel lines from the air separator connecting it to other components may or may not be included as part of the installation set means of attachment components, depending on a variety of commercial and practical considerations. A variety of particular adaptations and installations may be employed, and the air separator may be incorporated into any petroleum-based system, e.g., such as Class 8 Trucks, such as Caterpillar Model 3406 E, C13, C15, C16 or C18 engines, Detroit Series 60 Engines and Cummins N-14 Engines.

As shown, Applicant has therefore succeeded in providing the air separator installation set such that the air separator needs no integral electrical components or its own fuel pump Moreover, the air separator installation set may advantageously be provided separate from any water filter component.

Figure 8:
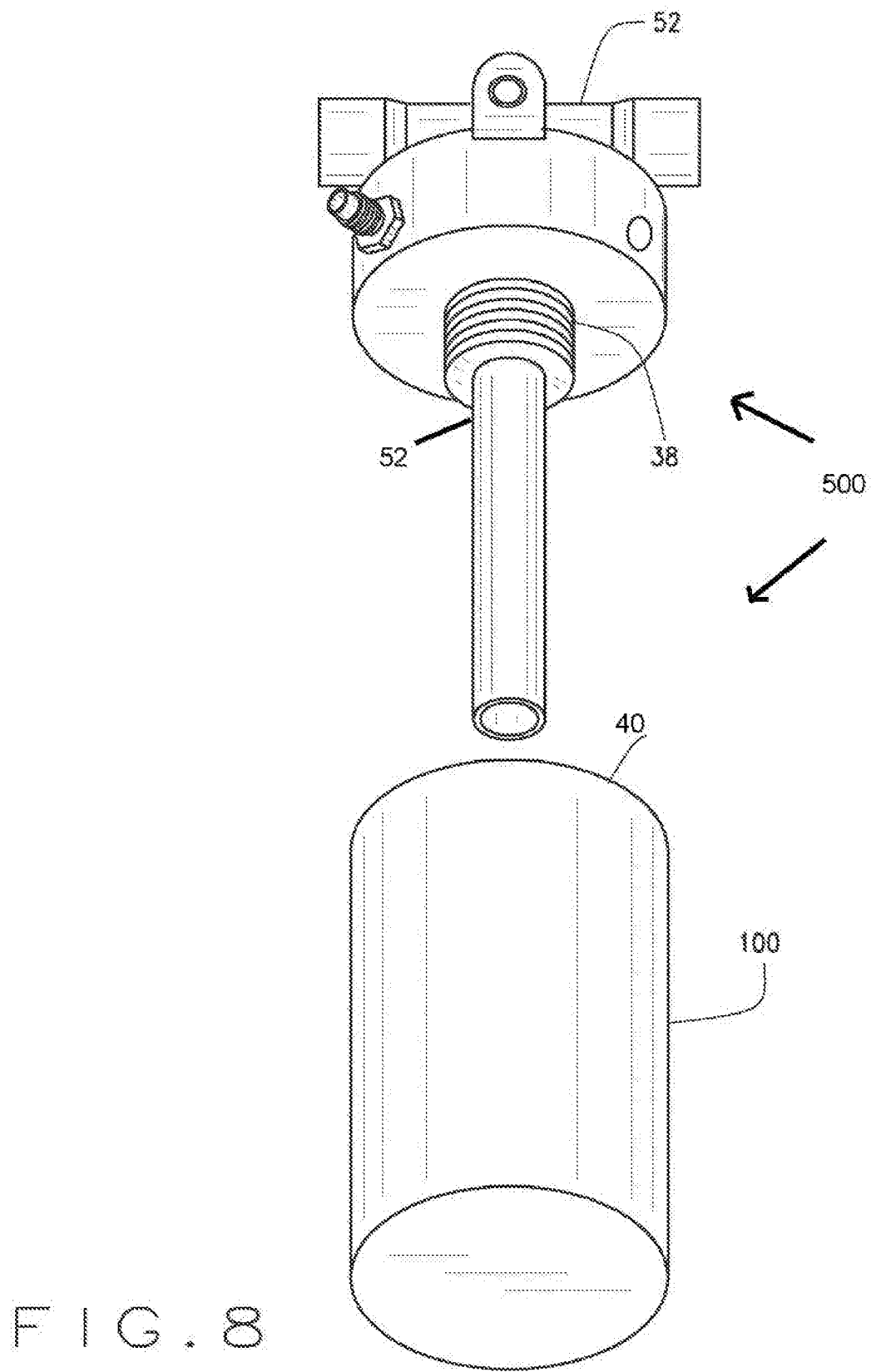
FIG. 8 is a front perspective view of an embodiment of a portion of the fuel delivery system of the invention wherein the air separator is mounted on a base of a secondary filter located between the fuel pump and the engine (not shown).

As depicted in FIG. 8, showing an air separator being installed, the air separator included in the installation set may be readily attached to a high pressure fuel delivery system, e.g., directly between the transfer pump and engine (see FIG. 7) resulting in a completed fuel delivery system containing such an air separator component.

Thus, the air separators, fuel delivery systems and installation sets of the present invention, with their single-unit air filter apparatus, provide a system surprisingly simple to install and operate, with enhanced air and gas separation performance. As described above, they eliminate the need for an additional air separator fuel pump and any electrical components integral to the air separator system. They offer the alternative of a stand-alone air separator fuel system component, independent of water filtration. Moreover, by enhancing the removal of fuel line gases and streamlining and simplifying the operating parts of the fuel-air separator, a readily installed, highly efficient, less expensive and more durable separator is provided.

It is to be understood that the above description is intended to be illustrative, and not restrictive. For example, the above-described embodiments, and/or aspects thereof, may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled.

This written description uses figures and examples to disclose various embodiments of the invention and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed:

1. A method for mounting an air separator in an operating fuel delivery system of a vehicle comprising the steps of:
    Obtaining a vehicle having the operating fuel delivery system, the operating fuel delivery system comprising an interconnected fuel tank, fuel pump and engine;
    Locating within the fuel delivery system a connection point wherein the fuel pump and the engine are in direct fluidic communication;
    Obtaining an air separator configured to be attached to the fuel delivery system at the connection point wherein the fuel pump and the engine are in direct fluidic communication, the air separator comprising:
    A vessel defining a hollow interior chamber having an inlet configured for receiving fuel from a fuel source, an outlet configured for fluidic communication with an engine; an air-bleed configured to receive and remove a quantity of undesired gas in fluidic communication with a discharge port, and a filter media positioned within said chamber for contact with fuel received therein and a conduit located within said filter media for delivering fuel passing through said filter media to said outlet; and configured to remove a quantity of undesired gas from said fuel prior to passage of said fuel through said outlet from said vessel to said engine, said undesired gas passing through said air-bleed, said air-bleed having a fluidic mixing alcove configured to enhance selective passage of said gas through said discharge port wherein the fluidic mixing alcove has an input opening area and an exit opening area, and the fluidic mixing alcove has a continuous tapering angle from the input opening area to the exit opening area reducing therebetween at between 20 degrees and 40 degrees;
    Obtaining attachment means for connecting the air separator to the fuel delivery system by fluidically mounting the air separator at the connection point wherein the fuel pump and the engine are in direct fluidic communication; and,
    Using the attachment means to mount the air separator.

2. The method of claim 1 wherein the air separator is installed in direct fluidic communication for separation and discharge of gases while remaining a closed fuel system not permitting any venting of gases to an open environment.

3. The method of claim 1 wherein the air separator is configured to attach to the fuel delivery system by means of connecting to a non-air separator fuel filter having an attachable base.

4. The method of claim 3 wherein the means for the air separator to connect to the non-air separator fuel filter base is selected from the group consisting of threaded connections, one or more latching mechanisms, and high pressure press fit.

5. The method of claim 1 wherein the air separator further comprises a flow divider and a filter head, and wherein the flow divider is configured as a flexible wiper blade which is positioned below the filter head.

6. The method of claim 5 wherein the air separator further comprises a filter nipple located below the filter head.

7. The method of claim 1 wherein the air separator further comprises a gas collection area dimensioned as a depression surrounding the fluidic mixing alcove.

8. The method of claim 1 wherein the air separator further comprises a vessel defining a raised hollow interior chamber and a lid configured to facilitate ready access to said chamber.

9. The method of claim 8 wherein the air bleed is located in the lid.

10. The method of claim 1 wherein the engine utilizes a combustible liquid for fuel.

11. The method of claim 10 wherein the engine utilizes a petroleum-based liquid.

12. The method of claim 11 wherein the engine utilizes diesel fuel.

13. The method of claim 11 wherein the engine utilizes gasoline.

14. The method of claim 10 wherein the engine utilizes alternative or renewable fuels.

* * * * *